United States Patent [19]

Ladt et al.

[11] Patent Number: 4,580,698

[45] Date of Patent: Apr. 8, 1986

[54] AUTOMATICALLY ADJUSTABLE CONTINUOUS FEEDER SYSTEM

[75] Inventors: Max A. Ladt; David L. Finke; Mark T. Curtis, all of Paducah, Ky.

[73] Assignee: Pebco, Inc., Paducah, Ky.

[21] Appl. No.: 498,082

[22] Filed: May 25, 1983

[51] Int. Cl.4 ............................................. B67D 5/08
[52] U.S. Cl. ...................................... 222/55; 222/63; 222/64; 222/71; 222/77; 222/504; 198/505; 177/16; 177/122
[58] Field of Search ....................... 222/52, 55, 59, 63, 222/64, 71, 77, 504; 73/290 V; 417/219; 198/502, 505; 177/16, 116, 122

[56]  References Cited

U.S. PATENT DOCUMENTS

| 2,745,539 | 5/1956 | Hazen | 198/37 |
| 2,792,923 | 5/1957 | Fraubose | 198/37 |
| 2,922,610 | 1/1960 | Bale | 177/116 |
| 2,997,205 | 8/1961 | Schuerger et al. | 222/1 |
| 3,042,261 | 7/1962 | Lovette | 222/56 |
| 3,065,740 | 11/1962 | Wiedmann et al. | 417/219 |
| 3,185,345 | 5/1965 | Loveall et al. | 222/55 |
| 3,223,964 | 12/1965 | Stadlin | 73/290 V |
| 3,303,967 | 2/1967 | Munson | 222/55 |
| 3,474,874 | 10/1969 | Pettis | 177/122 |
| 4,138,010 | 2/1979 | Pidgeon et al. | 198/573 |
| 4,354,622 | 10/1982 | Wood | 222/55 |
| 4,458,827 | 7/1984 | Stelte | 222/136 |
| 4,487,333 | 12/1984 | Pounder et al. | 222/54 |

FOREIGN PATENT DOCUMENTS 0003766  1/1979  Japan ................................ 222/55
1005414  9/1965  United Kingdom ............ 222/55

Primary Examiner—Joseph J. Rolla
Assistant Examiner—Andrew Jones
Attorney, Agent, or Firm—Woodard, Weikart, Emhardt & Naughton

[57]  ABSTRACT

A gate-type feeder control system has level and weight sensors for monitoring the output of the system to a conveyor or other receiver, an electronic control circuit responsive to the sensors, and a hydraulic actuator circuit including a plurality of valves to provide the desired output of a feeder gate. In the electronic circuit, a master set point signal is entered and compared with the output signal from the sensors. The output flow to the receiver of the system is continuously adjusted by a deviation controller to reduce the deviation in these two signals. Erratic changes in system output are avoided by a deadband circuit introduced into the electronic circuitry to buffer excessive oscillation, overresponse and even instability caused by transient size change and lumping associated with bulk materials. The electronic circuit also includes an averaging module to average the level/weight of the material being discharged to obviate responding to peak levels. Finally, utilization of stepped sequencing and time delay of the solenoid valves also maintains a more accurate profile on the belt while minimizing shock. In the hydraulic circuit, power for opening and closing the feeder gate is provided through the use of power cylinders with pressurized fluid being supplied by a compensating, variable volume pump.

12 Claims, 1 Drawing Figure

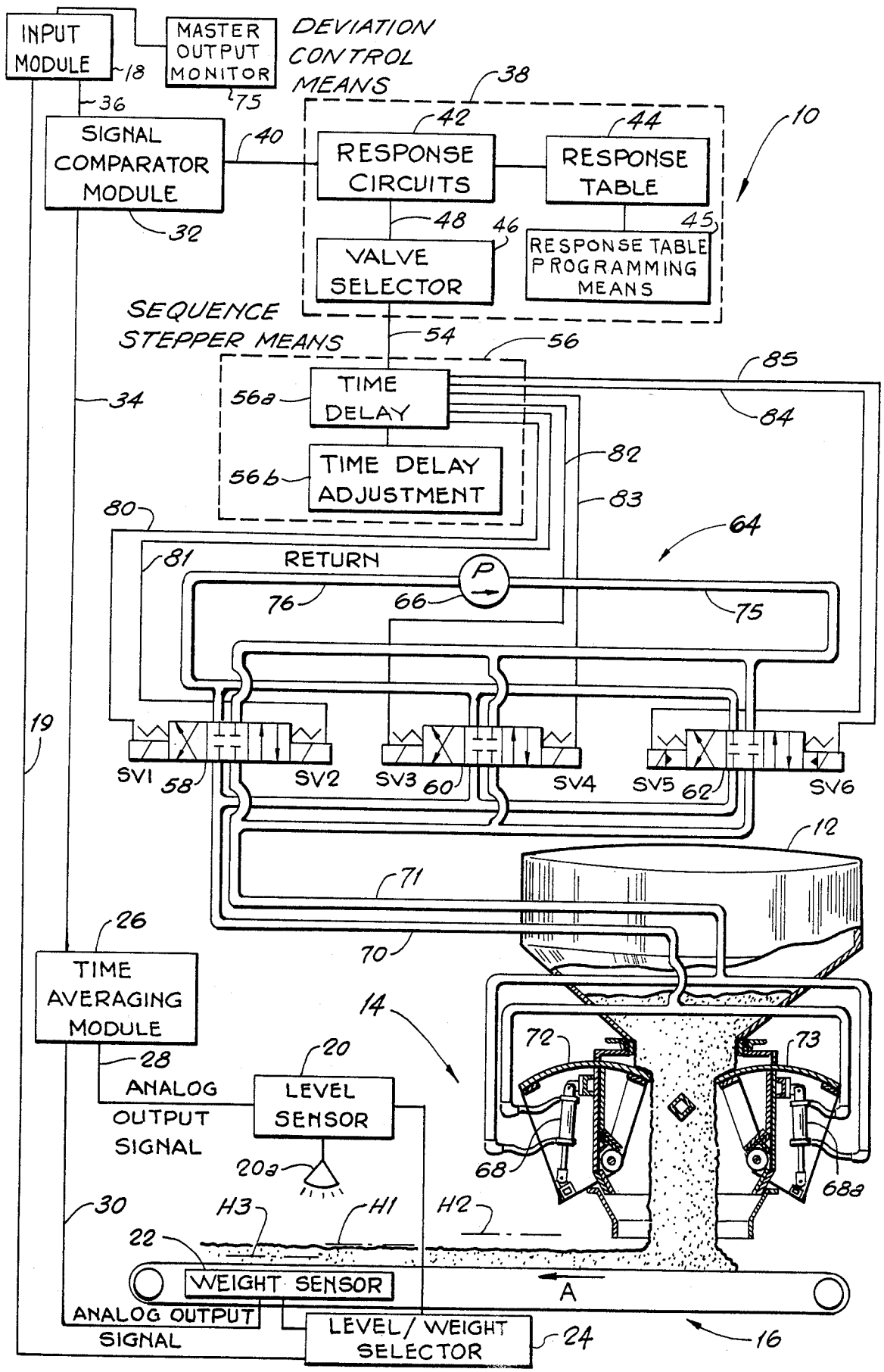

AUTOMATICALLY ADJUSTABLE CONTINUOUS FEEDER SYSTEM

BACKGROUND OF THE INVENTION

The present invention relates generally to bulk material handling and more particularly to a continuous feeder system responsive to the output placed upon a conveyor means, or output fed to a processing device, from a feeder control gate.

In the prior art, there have been several attempts made at controlling the flow of bulk material onto a belt conveyor or the like. For example, U.S. Pat. No. 2,792,923 to Fraubose et al discloses a system wherein the failure of the supply of material to any one or more of the different conveyors, or a reduction in the supply of material below the prescribed amount, automatically stops the drive of the motor or motors which are still conveying material. After the supply is restored, the conveyor motor or motors are again set into action automatically.

U.S. Pat. No. 2,997,205 to Schuerger et al discloses a system wherein the discharge of material from a bin or the like is controlled to hold the level of material in the bin within a predetermined range.

U.S. Pat. No. 3,042,261 to Lovette discloses a hopper gate assembly for mixing aggregate material wherein the gates may be fully or partially opened to any of several openings. The series of gates are opened and closed manually in a predetermined time sequence and in cooperation with a conveyor belt for receiving the output. If one bin runs low on its supply, the gates are closed sequentially by remote control to maintain the desired mix. Upon start-up, the gates are sequenced again, and to some degree proportionally, to assure the proper mix.

While the devices disclosed in these various patents do have advantages over a purely manual system, there are drawbacks. For example, the aforementioned systems do not provide valve control means to proportionally compensate for a change in the discharge flow rate. The output of the prior art systems are generally proportional to the weight of material in the hopper, as in the Fraubose et al '923 and Schuerger et al '205 patents, or require operator control to regulate the gates as in the Lovette '261 patent. As the weight of material in the hopper varies over time, the output varies, and the prior art systems have no way to compensate. Consequently, the accurate discharge of a selected quantity of material over a period of time is not possible.

The prior art systems also do not teach efficient control means to prevent excessive oscillation, overresponse and flow instability, which can be caused by such common material conditions as individual component size change, moisture content and lumping. Further, it has been found desirable to regulate the speed of opening and closing movement of the feeder gate to provide controlled sensitivity to changes in the flow, which is clearly not contemplated in the prior art.

Furthermore, the prior systems do not lend themselves to accurately control the discharge flow rate within a relatively small range. This function may be of considerable importance with respect to accurately formulating a final product made from a mixture of different bulk material streams. As one example, it is important to exactly maintain the proper proportions when mixing coals of different origins for coking in a coke oven.

Other systems for flow control use vibratory and reciprocating bed feeders. For high material flow requirements, these feeders become very large and massive, and are expensive to buy and maintain. These systems depend on vibrating masses to control the material flow and as the mass flow goes up, so does the size of the feeder components required to transmit the forces. Also, these feeders are basically volumetric control devices and are difficult to control for mass flow.

Futher, as inevitable parameter variations occur, such as component size change, moisture content and lumping, the problem of erratic flow of material in this type of system is greatly increased. This is so since the actual feeding action from the vibrating bed must be transmitted through layers of the product and as changes occur in the parameters the feed inevitably changes. As the vibrating action is changed in an attempt to compensate, the deleterious "hunting" of the systems occurs.

For large mass flow applications, the energy consumption of vibrating systems is relatively high, providing another disadvantage to this type of prior art system.

Thus a need and broad objective is identified for a new approach to controlling mass flow of bulk material wherein the problems inherent in the prior art systems are avoided. In particular, a feed control system that attains the objectives of being highly responsive and yet stable, inexpensive to build and operate and energy efficient is identified. With this as background, the basis for the following additional objects is formed.

DISCLOSURE OF THE INVENTION

Accordingly, it is the primary object of the present invention to provide a continuous bulk material feeder system having a feeder gate controllable in response to the amount of material being discharged to maintain a constant flow.

Another object of the invention is to provide a continuous bulk material feeder system having control to compensate for variations between preselected and actual outputs.

Another object of the invention is to provide a continuous feeder system which responds proportionally to the deviation between the desired and the actual amount of output.

Still another object of the invention is to provide a continuous bulk material feeder system with a feedback control for regulating bulk material discharge and eliminating excessive oscillation, overresponse and instability due to changes in material size and material aggregation.

A further object of the present invention is to provide a continuous bulk material feeder system having a feeder gate having blades infinitely adjustable between a fully opened and fully closed position and fully responsive to an automatic control system to provide a proportionally controlled output.

Still another object is to provide a system having proportional gate control means that can vary the speed of response depending on the need sensed on a continuously moving conveyor to maintain a constant level and/or weight of material.

Another object is to provide a control system having a feeder gate control with variable speed of response including stepped sequencing to assure smooth operation under all conditions.

Additional objects, advantages and other novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects in accordance with the purposes of the present invention as described herein, an improved apparatus is provided for controlling the discharge of bulk materials to a receiver means needing feed modulation positioned below a feeder control gate. While the inventive system will be described in conjunction with a belt conveyor forming the receiving means, it should be understood that within the broadest aspects, the concept applies to other types of conveyors, chutes and conveying passageways, as well as such related processing equipment as crushers, grinders, blenders, weigh hoppers, batching systems, screens, dryers and many other types of equipment. Furthermore, although a single gate and control system is shown, it should be understood multiple units may be used together where desired.

Sensor means are provided for sensing the amount of bulk material being discharged from the feeder control gate to the receiver means. An input module is also provided for entering the desired output into the electronic control circuitry of the continuous feeder system. Comparator means are included for continuously comparing the actual feeder system output with the entered, desired output. The provision of deviation control means allows for the continuous adjustment of the feeder system to discharge the desired output of bulk material in response to the comparator means.

The feeder system also includes a sequence stepper means responsive to the deviation control means. The sequence stepper means provides smooth operation of the feeder control gate for greater sensitivity while minimizing shock and erratic action, as will be explained more in detail below. Preferably, the system also includes both a weight and a level detector. This allows the operator of the system to obtain the desired output by either volume or mass or a combination. Further, the output levels on the conveyor or receiving device detected by these sensors are averaged over time. This feature maintains a more accurate output by eliminating system reaction to temporary peak levels, thus further assuring smooth operating action. The sensors may be of any appropriate type including electronic, mechanical, ultrasonic and capacitance transducers.

The feeder control gate includes self-sealing blades proportionally operated between fully opened and fully closed positions by hydraulic power cylinders. Power is provided to these cylinders by means of a pressure compensating, variable volume pump. In the preferred embodiment, a series of directional control valves are interposed in the hydraulic lines between the variable volume pump and the power cylinders. Each of these valves may be of a different size and flow capability. The largest valve generally is capable of handling the total volumetric output of the power unit. In any event, the valves are chosen to match the desired output and response characteristics of the feeder control gate.

Still more specifically, the deviation control means of the preferred embodiment includes computer circuitry operative to allow the insertion of a preprogrammed response table. A deadband may be introduced into this response table to buffer excessive oscillation, overresponse and instability caused by the transient material size change and lumping associated with bulk materials. Deviation bands may also be introduced into this response table for values both above and below the set point value. It is the deviation control means which selects the directional control values to be energized. This energization is based upon the provision of a gate opening and closing speed proportional to the degree of deviation existing between the actual material discharge and the desired discharge.

The sequence stepper means preferably comprises time delay circuitry. This feature is provided to integrate timed stepped delay response into the energization cycle of the power cylinders of the gate. The net result is substantially linear acceleration of the feeder control gate. The gate of the invention can respond rapidly to correct either large or small deviations, but in either case the movement is smooth and controlled. For the largest corrections, the control valves are sequentially stepped into operation, both during opening and closing; i.e. the valve with the least flow(greatest restriction) being operated first; the valve with the next largest flow being operated next after a time delay; and so forth until all of the valves are opened in the proper direction. When the desired position is reached, all of the valves are closed in reverse sequence and then keeping the gate in the desired position until the feedback control circuit of the invention once again indicates a change is necessary whereupon the control sequence is repeated. The responsiveness of the feeder system may be varied by adjustment of the time delay between the activation of the directional control valves.

Still other objects of the present invention will become readily apparent to those skilled in this art from the following description wherein there is shown and described a preferred embodiment of this invention, simply by way of illustration of one of the best modes suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the sole drawing FIGURE a continuous feeder system for controlling discharge of bulk material in accordance with the present invention is schematically illustrated.

DETAILED DESCRIPTION OF THE PREFERRED EMBODIMENT

Reference is now made to the drawing FIGURE showing a continuous bulk material feeding system 10 constructed according to the present invention for automatically controlling the discharge of bulk material. The illustrated system includes a hopper 12 for storing a large quantity of bulk material, such as coal, for example. Bulk material from the hopper 12 is discharged through a flow control gate 14 onto a receiving means, such as a continuously moving conveyor 16, or directly to additional processing equipment (not shown), as explained above. The system 10 controls the flow of bulk material through the flow control gate 14 so as to maintain a substantially constant and preselected volume burden and/or weight of bulk material on the conveyor.

The preselected quantity of material desired on the conveyor 16 is manually entered into the system by an operator through an input module 18. The input module 18 preferably also includes a selector switch(not shown) for activating one of several sensors for determining the quantity of bulk material on the conveyor 16. As illustrated, one(or both) of two different sensors, a level sensor 20 with transducer 20a and a weight sensor 22, which can be a scale, are utilized to detect the quantity of bulk material on the conveyor 16. A level/weight selector 24 operates in response to a signal from the input module along the control line 19.

The use of such a dual sensing system(level and/or weight) permits the quantity of bulk material on the conveyor 16 to be modulated as accurately as possible. The desired quantity per unit of time of bulk material on the conveyor 16 may be preselected and entered by an operator into the input module 18, as either a volume or a weight measurement or a combination. By having this dual capability, the versatility of the system to handle different aggregate products is greatly enhanced. Also, by using a dual control better response over changes in aggregate size and moisture content is obtained.

Both the level sensor 20 and the weight sensor 22 transmit analog output signals to a time/level averaging module 26; the output of the level sensor 20 being applied along a control line 28 and the output of the weight sensor being applied along a control line 30. The time/level averaging module 26 averages the output signal of the level sensor 20 and/or the weight sensor 22 over a preselected period of time to minimize signal fluctuations from momentary conditions on the conveyor 16, and applies the averaged output to a comparator module 32 as a digital signal along a control line 34. The averaging period can be adjusted to make the entire system more or less responsive. Also, if desired the signal may be retained as an analog signal along line 34. The comparator module 32 also receives the output of the input module 18 along a control line 36; the input module 18 output representing the preselected quantity entered by the operator. An output signal representative of the deviation between the signals from the input and time/level averaging modules 18 and 26, respectively, is generated by the comparator module 32 and applied to a deviation control module 38 along a control line 40.

The deviation control means 38 includes a series of response circuits 42 which receive a selected band or range of deviations in accordance with preprogrammed information represented by a response table 44. Response table programming means 45 is provided so that the operator can pre-program the response table to provide the desired operation of the actuator means. The table 44 includes a deadband in the form of a narrow range of deviation both above and below the desired quantity, for which no response circuit is provided. This deadband serves in addition to time/level averaging module 26 to buffer the system 10 from excessive oscillation, over-response and even instability caused by transient level/weight variations, as described above. Thus, if the deviation signal from the comparator module 32 is within the predetermined limits of the deadband, no signal is directed to valve selector 46. If, however, the deviation signal from the comparator module 32 is above or below the predetermined limits of the deadband, a particular active response circuit(within the response circuits 42), corresponding to that amount of deviation, will produce an output signal directed along line 48 to the valve selector 46.

The output signal from the valve selector 46 is passed along control line 54 through a sequence stepper means 56 to control a series of hydraulic directional control valves 58, 60 and 62 serving to regulate flow in hydraulic circuit 64. Only those valves necessary to adjust for the degree of deviation needed are energized. A pressure compensating, variable volume pump 66 serves as a pressure source for the circuit and the sequential opening of the valves 58, 60, 62 in a particular direction, in turn operates the feeder gate 14 providing the desired control.

The sequence stepper 56 includes a time delay module 56a and a time delay adjustment 56b. The hydraulic valves 58,60 and 62 include solenoid actuators SV1-SV2, SV3-SV4 and SV5, SV6, respectively. The valves 58,60,62 feed pressurized fluid to power cylinders 68,68a to either open or close the gate 14 dependent on the solenoid activated by the valve selector 46 and time delay module 56a. When the point of equilibrium of desired flow from the gate 14 is reached, the valves 58,60,62 are returned to the home position by centering springs (shown schematically in the FIGURE), the flow is interrupted and the gate 14 remains in the desired feeding position.

The control circuit 64 includes pressure conduits 70, 71 receiving fluid from the valves 58,60,62. When an increase in flow and thus opening of the gate 14 is required, the conduit 70 is pressurized causing the cylinders 68,68a to be extended thus moving curved blades 72,73 to provide a larger opening. The pressure action in conduit 70 is provided by activation of one, or in sequence more than one, of solenoids SV2, SV4 and SV6. When this is done, pressure from the pump 66 flowing through pressure input conduit 75 passes through each of the valves 58,60,62 that are activated. As shown, the solenoids SV2, SV4, SV6 pull the spool element of the valve (schematically shown) to the right in the drawing, thus providing the flow in the direction of the flow arrows shown. When approaching the proper flow, the solenoids are sequentially deactivated and the corresponding springs push the spool elements back to the closed position (shown in the drawing). Of course, as pressure is being provided through the input conduit 75, through the valves and to the pressure conduit 70, return or negative pressure flow is being provided along the pressure conduit 71 and return conduit 76 to relieve the opposite end of the cylinders.

When a reduction in flow is required to maintain the constant burden on the conveyor 16, the gate 14 must be moved toward the closed position. In this case solenoids SV1, SV3, SV5 are actuated providing the pressure flow through conduit 71 to move the cylinders 68,68a causing the blades 72,73 to move and increase the blocking action of the opening from the hopper 12. In this instance, the return flow moves along the conduit 70 back through the valves and into the return conduit 76. When the solenoids SV1, SV3, SV5 are deactivated, the corresponding centering spring returns the spool element of the valves to the center position cutting off the flow and positioning the gate 14 in the new desired position.

The signal for operating the solenoids SV1, SV2 is provided over a pair of control lines 80,81, respectively. These control lines are attached to the time delay 56a of the sequence stepper means 56. Similarly, control lines 82,83 provide the connection to the solenoids SV3, SV4 and control lines 84,85 serve to operate the solenoids SV5, SV6.

In order to carry out the objectives of the invention for optimum sensitivity, but at the same time having smooth and controlled operation, the valves 58,60, 62 are selected to be of increasingly greater flow capacity; i.e. the valve 58 having the greatest restriction through the spool element, and thus the least flow capacity; the valve 60 having less restriction and more flow capacity; and the valve 62 having the least restriction and the greatest flow capacity. Thus, when the valve selector 46 designates one or more of the valves 58,60,62 to open, sequence stepper means 56 is operative to actuate the valves in the proper sequence from the lowest capacity valve 58 up to the highest capacity valve 62. The sequencing is done both during the opening of the gate 14, as well as the closing of the gate, so that smooth modulating action can be gained in either instance. The sequence stepper means 56 also provides for closing the valves in sequence from the largest to the smallest valve as the gate 14 approaches its point of desired equilibrium. Thus, as the curved blades 72,73 reach the point where the flow is proper, controlled deceleration will occur providing for the desired smoothness of operation.

By adjusting the time delay through time delay adjustment 56b, the valves 58,60,62 can be made more or less responsive. In other words, if faster response is desired, less time delay is provided between the time of opening valve 58 and sequencing in valves 60 and 62. Thus, if aggregate material needing particularly fast response is being discharged, the time delay is reduced by the delay adjustment 56b allowing more rapid change in position of the curved blades 72,73 of the gate 14. Also, the opening of the gate 14 can be fine tuned by varying the spread of the response circuits 42 of the deviation control means 38. If more sensitivity is desired, the response circuits are narrowed, but at the same time, this change reduces the range over which variable action can be obtained. Similarly, if the response circuits are expanded, a greater range can be obtained, but sensitivity is reduced. Of course, the dead band circuit within the response circuits 42 can be reduced in spread to increase the lower end sensitivity, or increased in spread to require greater variation in the flow before a change in the gate 14 occurs. In normal operation operating on a particular aggregate material, the input module 18, the response circuits 42 and the time delay adjustment 56b are initially set to the desired position. Once set, the system itself compensates for variations in the material providing the desired control to maintain the flow at a desired level, such as H1, as shown.

In the preferred embodiment illustrated, the first in-line valve 58 may be selected to handle 1/10(0.1) of the volumetric output of the valve 62. Intermediate valve 60 is preferably selected to be capable of handling approximately 3 times this amount; that is, 3/10(0.3) of the volume of the largest capacity valve 62. In turn, the largest valve 62 is selected to be capable of transferring the approximately total volumetric output of the pump 66. Thus, as each valve is sequenced on and off, the stepped operation can be realized and smooth control of the gate 14 is assured. It is apparent, however, that the size and volumetric capacity of the hydraulic valves 58,60,62 may be selected to meet the particular needs of the bulk handling application desired.

It will also be appreciated by those skilled in the art that the input module 18, the signal comparator module 32, the deviation control means 38 and the sequence stepper means 56 may be components of a programmable controller. To operate the controller, suitable software may be utilized in accordance with well known programming techniques. One well known commercially available programmable controller suitable for this purpose is the Modicon 584 model sold by Modicon Division of Gould, Inc. of Andover, Mass.

In operation, the operator initially enters the desired value representing the quantity of material on the conveyor 16 or other receiving device. As shown in the drawing, the quantity of material may be represented by the different levels H1, H2, and H3, and the level H1 being the one selected. The entering of this data is made in the input module 18, and at the same time a selection is made as to whether the monitoring of the level of material should be by volume or weight. The level/weight selector actuates the proper level sensor 20 or weight sensor 22. Furthermore, the selector 24 can be actuated if desired to provide a combination of sensing if desired. In any case, the analog output signal is transmitted through the appropriate lines 28, 30 to the time/level averaging module. This device averages the output signal from the selected sensor(s) and transmits a digital output signal to the comparator module 32.

The comparator module 32 relates this incoming signal to a signal representing the desired quantity of bulk material transmitted over line 36 from the input module 18. The deviation between these two signals is determined and a new signal representing this deviation is transmitted over line 40 to the deviation control means 38.

The deviation control means then positions the deviation signal in the proper response band in the response circuits 42. Once properly positioned, a signal representing that band is transmitted to the valve selector 46. If the deviation is minor, only a single valve 58 is selected for activation in the proper direction to open or close the valve 14 to bring the level of material back to that desired. If the variation is substantial and faster response is necessary, then the valve selector 46 selects additional valves 60 and/or 62 to provide the proper opening or closing movement.

Within the response circuits 42, is a dead band that has been originally inserted as a part of the response table 44. In the event that the signal 40 is within the span of the dead band, there is no signal transmitted over the line 48 and thus no valve selected. With this feature, a slight variation is ignored and the system is allowed to continue, thus preventing unnecessary oscillation and hunting of the system. This function is assisted by the operation of the time/level averaging module where momentary variations in the material do not cause a change in the signaling over the line 34, but instead the average of the signal is transmitted for comparison and control.

When the valve selector 46 has received a proper response and determined that it is within the appropriate response circuit calling for change in the adjustment of the gate 14, the signal over line 54 passes through a sequence stepper means 56 in order to provide the desired controlled sequencing of the valves 58,60,62. For example, in an instance where the valve selector 46 determines that valves 58 and 60 should be activated, the time delay 56a, depending on the adjustment previously made, provides a signal first over one of the lines 80, 81 to start the valve 58 moving in the desired direction. Once the blades 72,73 accelerate to full speed in accordance with the flow through the valve 58, the appropriate signal is transmitted over lines 82,83 to next operate the valve 60 and thus provide further acceleration and faster movement. As the curved blades 72,73 of the gate 14 approach the desired position, the valves 60,58 are deactivated in reverse order, thus providing the appropriate deceleration of the blades 72,73. The utilization of both the stepped sequencing of the sequence stepper means 56 and the time/level averaging of the module 26 maintains a more accurate load profile on the conveyor 16 while providing faster response and minimizing shock to the feeder gate 14 and the system 10.

With further reference to the drawing, assuming the level H1 is the level of material desired on the conveyor belt 16, as provided to the input module 18, should the time averaged level detected by the level sensor 20 and/or the weight sensor 22 fall to H3, a change is signaled to the deviation control means 38 and the sequence stepper means 56 to activate the proper directional control valves 58,60,62. The gate 14 is opened the required amount, thus widening the gap between the blades 72,73. When the level H1 is again obtained, the valves sequence back to the closed position, allowing the material to continue to flow at the new rate until a new change is required.

Similarly, if an increased level H2 occurs on the belt 16, the sensors 20,22 provide a time averaged signal through the module 26, the signal comparator module 32, the deviation control means 38 and the sequence stepper means 56 in order to operate the valves 58,60, 62 to move the blades 72,73 toward the closed position. The proper sequencing of the valves into operation occurs during this closing movement and when the proper new position is approached the valves 58,60,62 sequence to the closed position leaving the gate 14 at the new desired position where the level H1 is again attained. This setting of the gate 14 holds until another change is required.

As an added feature, the input signal to be applied to the input module 18 to establish the set point of the overall system may be provided automatically by a master output monitor 75 positioned downstream of the sensors 20,22. Thus, the set point adjustment can be made and changed automatically to match any change needed, in the final weight or volume for example, actually being delivered by the conveyor 16. If the monitor 75 detects a need to increase or decrease the set point, the input module 18 makes the change, and the appropriate comparison and compensation is carried out in the comparator module 32. As a result, the appropriate enhanced signal is fed to the control system over line 40 and the changes in flow from gate 14 as previous described follows. In the event several feeder systems are being used, the master output monitor 75 is positioned downstream of the convergence point and feeds back a signal to properly adjust the multiple input modules by the amount that in aggregate corrects the error.

The foregoing description of preferred embodiment of the invention has been presented for purposes of illustration and description. It is not intended to be exhaustive or to limit the invention to the precise form disclosed. Obvious modifications or variations are possible in light of the above teachings. In accordance with the broadest aspects of the invention, a servo valve could be used in place of the plurality of solenoid valves. The valve or valves may be responsive to sensed parameters or stimuli other than level and/or weight of the material, as described in conjunction with the prefered embodiment. For example, the sensors 20, 22 can be replaced or supplemented by suitable transducers monitoring energy consumption of the receiving device, such as horsepower draw from a crusher; sound level or frequency emanating from the receiving device, such as the noise from a grinding mill (or similar processors); vibration frequency or amplitude of receiving device such as the damping effect of material going to a vibratory conveyor or a screen; density occurring in receiving device such as the change in density of a liquid/solid mixture as a result of the introduction of solid; or even other parameters associated with bulk handling equipment. Also, multiple gates of the type disclosed in this invention could also be used to blend or regulate a mixture of materials from different points at the same time. The single gate embodiment was chosen and described to provide the best illustration of the principles of the invention in its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A continuous feeder system for bulk material, comprising:
    a. receiving means;
    b. a flow control gate for feeding bulk material to said receiving means;
    c. sensor means for sensing the amount of bulk material being discharged to said receiving means, the sensor means including both a weight and a level detector so that the output of the system may be monitored by volume and mass;
    d. means to time average the output levels detected by the sensor means;
    e. means for generating a master set point representing the desired output of the continuous feeder system;
    f. comparator means for comparing the amount of bulk material being discharged with the master set point;
    g. deviation control means for establishing the desired output of bulk material in response to said comparator means;
    h. actuator means for operating said flow control gate in response to said deviation control means; and
    i. sequence stepper means responsive to said deviation control means for operating said actuator means at a sequentially stepped variable rate to provide smooth operation of said flow control gate and minimizing shock and hunting of said continuous feeder system.

2. A continuous feeder system as in claim 1, wherein the sensor means includes an ultrasonic transducer to monitor the level.

3. A continuous feeder system as in claim 1, wherein said sensor means includes a scale cooperating with said receiver means.

4. A continuous feeder system as in claim 1 wherein is provided a master output monitor means responsive to the final output of bulk material for changing the master set point as required.

5. A continuous feeder system for bulk material, comprising:
 a. receiving means;
 b. a flow control gate for feeding bulk material to said receiving means;
 c. sensor means for sensing the amount of bulk material being discharged to said receiving means;
 d. means for generating a master set point representing the desired output of the continuous feeder system;
 e. comparator means for comparing the amount of bulk material being discharged with the master set point;
 f. deviation control means for establishing the desired output of bulk material in response to said comparator means;
 g. actuator means for operating said flow control gate in response to said deviation control means, said actuator means including hydraulic power cylinder means for operating said gate between a fully opened and fully closed position, and further including directional valve means between said pressure compensating, variable volume pump and said hydraulic power cylinder means, said directional valve means including a plurality of control valves of different flow capacities to match the desired response characteristics of the flow control gate; and
 h. a pressure compensating, variable volume pump providing hydraulic power to said hydraulic power cylinder means.

6. A continuous feeder system for bulk material, comprising:
 a. receiving means;
 b. a flow control gate for feeding bulk material to said receiving means;
 c. sensor means for sensing the amount of bulk material being discharged to said receiving means;
 d. means for generating a master set point representing the desired output of the continuous feeder system;
 e. comparator means for comparing the amount of bulk material being discharged with the master set point;
 f. deviation control means for establishing the desired output of bulk material in response to said comparator means, said deviation control means including a means to insert a pre-programmed response table to provide the desired operation of said actuator means, and a means for adjusting a series of deviation bands in the response table for values both above and below the master set point value; and
 g. actuator means for operating said flow control gate in response to said deviation control means.

7. A continuous feeder system as in claim 6, wherein said deviation control means includes means for introducing a deadband into the response table to buffer excessive oscillation, overresponse and instability caused by the transient material size change and lumping associated with bulk materials.

8. A continuous feeder system for bulk material, comprising:
 a. receiving means;
 b. a flow control gate for feeding bulk material to said receiving means;
 c. sensor means for sensing the amount of bulk material being discharged to said receiving means;
 d. means for generating a master set point representing the desired output of the continuous feeder system;
 e. comparator means for comparing the amount of bulk material being discharged with the master set point;
 f. deviation control means for establishing the desired output of bulk material in response to said comparator means, said actuator means including a plurality of control valves, and said deviation control means including means to select the combination of control valves to be energized so as to provide a gate opening and closing speed proportional to the degree of deviation existing between the actual material output and the desired output; and
 g. actuator means for operating said flow control gate in response to said deviation control means.

9. A continuous feeder system for bulk material, comprising:
 a. receiving means;
 b. a flow control gate for feeding bulk material to said receiving means;
 c. sensor means for sensing the amount of bulk material being discharged to said receiving means;
 d. means for generating a master set point representing the desired output of the continuous feeder system;
 e. comparator means for comparing the amount of bulk material being discharged with the master set point;
 f. deviation control means for establishing the desired output of bulk material in response to said comparator means;
 h. actuator means for operating said flow control gate in response to said deviation control means; and
 i. sequence stepper means responsive to said deviation control means for operating said actuator means to provide smooth operation of said flow control gate and minimizing shock and hunting of said continuous feeder system, said sequence stepper means including time delay circuitry to integrate timed stepped delay response into said actuator means to give substantially linear acceleration of said feeder gate.

10. A continous feeder system as in claim 9, wherein said actuator means includes a plurality of directional control valves, and said delay circuitry includes means for adjusting the time delay between the the directional control valves, thereby increasing or decreasing the responsiveness of the feeder system to changes in the output level.

11. A continuous operating system comprising:
 a. operating means for providing a desired output;
 b. sensor means for sensing the amount of output from the operating means;
 c. means for generating a master set point representing the desired output of the operating means;
 d. comparator means for comparing the output with the master set point;
 e. deviation control means for establishing the desired output in response to said comparator means;

f. actuator means for operating said operating means in response to said deviation control means; and g. said actuator means including hydraulic power cylinder means for actuating said operating means, said power means including a hydraulic pump and directional valves connected in parallel to each other, whereby the actuator means is operated by hydraulic pressure provided by the valves.

12. A continuous operating system as described in claim 11 and wherein said valve means includes a plurality of control valves of different flow capacities to match the desired response characteristics of the operating means, sequence stepper means responsive to said deviation control means for operating said control valves in sequence to provide smooth operation of said operating means and minimizing shock and hunting of the operating system.

* * * * *